United States Patent [19]

Kawakita

[11] Patent Number: 5,183,447
[45] Date of Patent: Feb. 2, 1993

[54] SEAT RECLINING MECHANISM

[75] Inventor: Tadashi Kawakita, Kanagawa, Japan

[73] Assignee: Ikeda Bussan Co., Ltd., Ayase, Japan

[21] Appl. No.: 749,588

[22] Filed: Aug. 26, 1991

[30] Foreign Application Priority Data

Aug. 29, 1990 [JP] Japan ................ 2-90150[U]

[51] Int. Cl.⁵ ........................................ A47C 1/025
[52] U.S. Cl. .................................... 475/341; 297/362
[58] Field of Search ............... 475/317, 331, 338, 339, 475/340, 341; 297/348, 362, 352

[56] References Cited

U.S. PATENT DOCUMENTS

| | | | |
|---|---|---|---|
| 3,705,522 | 12/1972 | Ogawa | 475/341 |
| 4,043,216 | 8/1977 | Steer | 475/341 X |
| 4,598,947 | 7/1986 | Fourrey et al. | 297/354 X |
| 4,880,274 | 11/1989 | Ichikawa | 297/362 |
| 5,127,286 | 7/1992 | Wittig | 297/362 X |

FOREIGN PATENT DOCUMENTS

| | | | |
|---|---|---|---|
| 626378 | 4/1963 | Belgium . | |
| 1140448 | 2/1983 | Canada . | |
| 0319393 | 11/1988 | European Pat. Off. . | |
| 0332340 | 9/1989 | European Pat. Off. . | |
| 388207 | 9/1990 | European Pat. Off. | 475/341 |
| 2907134 | 12/1980 | Fed. Rep. of Germany . | |
| 3026799 | 1/1982 | Fed. Rep. of Germany | 297/348 |
| 3201309 | 7/1983 | Fed. Rep. of Germany | 297/348 |
| 1566179 | 3/1967 | France . | |
| 7905884 | 2/1976 | France . | |
| 367144 | 5/1939 | Italy | 475/341 |
| 58-26602 | 8/1983 | Japan . | |
| 60-187645 | 12/1985 | Japan . | |
| 60-187646 | 12/1985 | Japan . | |
| 364954 | 11/1962 | Switzerland | 475/339 |
| 1519614 | 8/1978 | United Kingdom . | |
| 2012387 | 7/1979 | United Kingdom | 475/317 |
| 1586869 | 3/1981 | United Kingdom . | |
| 2234550A | 2/1991 | United Kingdom . | |
| 8500859 | 2/1985 | World Int. Prop. O. | 475/341 |

Primary Examiner—Leslie A. Braun
Assistant Examiner—Khoi Q. Ta
Attorney, Agent, or Firm—Foley & Lardner

[57] ABSTRACT

A seat reclining mechanism for adjusting the angular position of a seatback relative to a seat cushion by a planetary gear arrangement includes a rotatable shaft, a base plate, a pivotable arm, a control gear, a plurality of planetary gears, and two supporting plates. The pivotable arm is rotatably connected to the base plate through the rotatable shaft. Each planetary gear has two opposed cylindrical projections. Each supporting plate is coaxially mounted on the rotatable shaft for supporting the planetary gears in such a manner that the cylindrical projections of each planetary gear is rotatably supported by the supporting plates and that the planetary gears are held in a predetermined revolution orbit around the control gear.

11 Claims, 2 Drawing Sheets

SEAT RECLINING MECHANISM

BACKGROUND OF THE INVENTION

1. Field of the Invention

The present invention relates in general to a seat reclining mechanism, and more particularly to a seat reclining mechanism for adjusting the angular position of a seatback relative to a seat cushion by a planetary gear arrangement.

2. Description of the Prior Art

Japanese Utility Model First Provisional Publication 60-187645 discloses a seat reclining mechanism which comprises a base plate, a pivotable arm, a rotatable shaft, two control gears, four planetary gears and a supporting plate. The base plate and the pivotable arm are pivotally interconnected by the rotatable shaft. The base plate and the pivotable arm have circular recesses which are generally opposed to each other, respectively. The base plate and the pivotable arm are respectively formed with ring gears at cylindrical surfaces defined by the circular recesses. The control gears are mounted on the rotatable shaft, and one of them is selectively fixed to the rotatable shaft so as to be rotatable therewith. The planetary gears are meshed with the control gears and also meshed with the ring gears surrounding the planetary gears. Each planetary gear has larger-diameter and smaller-diameter toothed portions. The supporting plate is rotatably mounted on the rotatable shaft. The supporting plate is generally disklike in shape and has four concave depressions by each of which the smaller-diameter toothed portion of the planetary gear is held in a predetermined revolution orbit around the control gears.

The seat reclining mechanism has an unsatisfactory durability.

SUMMARY OF THE INVENTION

It is therefore a general object of the present invention to provide a seat reclining mechanism which has an improved durability as compared with the above-mentioned conventional seat reclining mechanism.

It is a more specific object of the present invention to provide a seat reclining mechanism in which friction between a supporting plate and planetary gears is substantially reduced as compared with the conventional seat reclining mechanism.

According to the present invention, there is provided a seat reclining mechanism including: a rotatable shaft; a base plate which has a first through hole for receiving the rotatable shaft therein, the base plate having at a major surface thereof a first cylindrical recess which is coaxial with the rotatable shaft, the base plate having a first ring gear at a cylindrical surface defined by the first cylindrical recess; a pivotable arm which is rotatably connected to the base plate through the rotatable shaft, the pivotable arm having a second through hole for receiving the rotatable shaft therein, the second through hole being in alignment with the first through hole, the pivotable arm having at a major surface thereof a second cylindrical recess which is merged with the first cylindrical recess so as to define a cylindrical space between the base plate and the pivotable arm, the second cylindrical recess being coaxial with the rotatable shaft, the pivotable arm having at a cylindrical surface defined by the second cylindrical recess a second ring gear which is disposed side by side with the first ring gear, the first and second ring gears having the same addendum circle but a different number of teeth; a control gear securely and coaxially mounted on the rotatable shaft, the control gear being received in the cylindrical space; a plurality of planetary gears each of which has a toothed portion received in the cylindrical space in such a manner that the toothed portion is meshed with the first and second ring gears and the control gear, each of the planetary gears having a first cylindrical projection which is formed on a rotation center of each of the planetary gears; and a first supporting member for supporting the planetary gears in such a manner that the first cylindrical projection of each planetary gear is rotatably supported by the first supporting member and that the planetary gears are held in a predetermined revolution orbit around the control gear, the first supporting member being coaxially mounted on the rotatable shaft.

By virtue of the provision of the cylindrical projection which is supported by the supporting member, it is made possible to obtain smooth rotation of the planetary gears and thus improved durability of the seat reclining mechanism.

DESCRIPTION OF THE PREFERRED INVENTION

Figure 1:
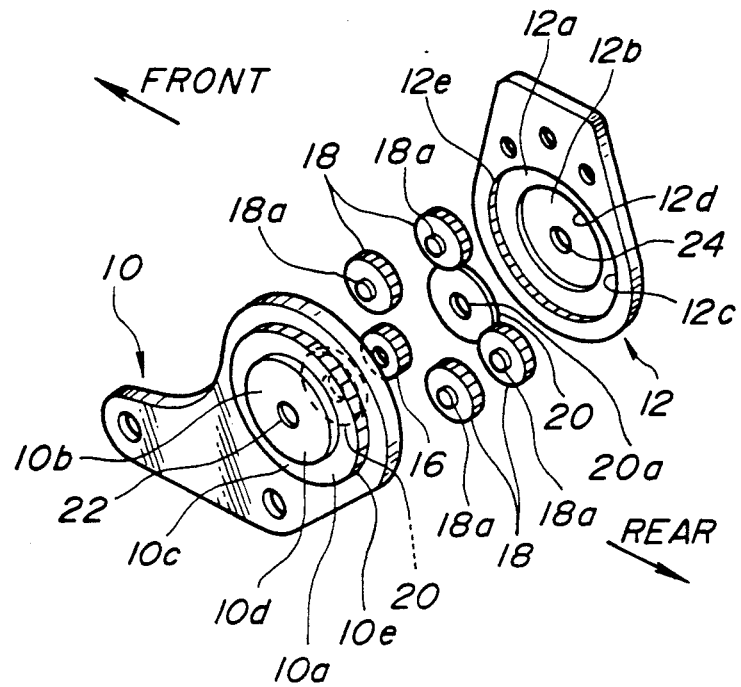
FIG. 1 is an exploded perspective view of a seat reclining mechanism, which is a first embodiment of the present invention.
Figure 2:
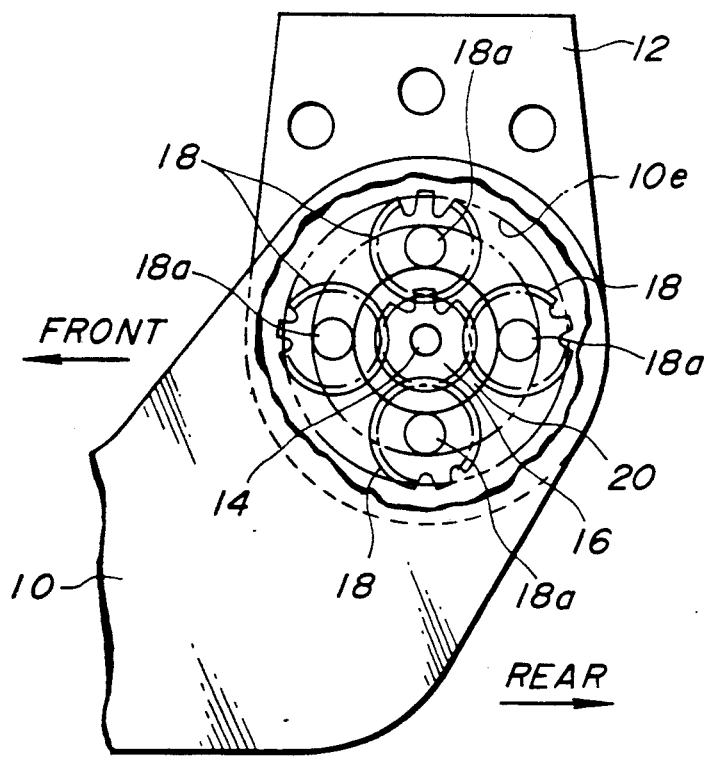
FIG. 2 is an enlarged side, but partially cut away, view of the seat reclining mechanism of the first embodiment.
Figure 3:
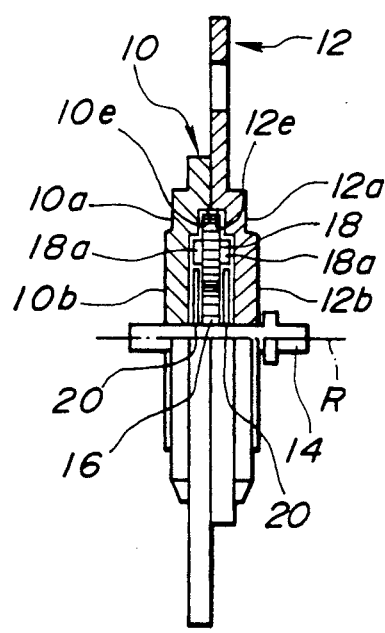
FIG. 3 is a rear, but partly sectional, view of the seat reclining mechanism of the first embodiment.

Referring to FIGS. 1 to 3, there is shown a seat reclining mechanism, which is a first embodiment of the present invention.

As is known, a seatback (not shown) of a seat (not shown) is rotated to a desired angular position relative to a seat cushion (not shown) of the seat through the seat reclining mechanism.

The seat reclining mechanism comprises a base plate 10, a pivotable arm 12, a rotatable shaft 14, a control gear 16, a plurality of planetary gears 18 (four planetary gears in this embodiment) and two supporting plates or supporting members 20.

The base plate 10 and the pivotable arm 12 are secured to the seat cushion and the seatback, respectively. The base plate 10 and the pivotable arm 12 are respectively formed with circular through holes 22 and 24 which are horizontally aligned with each other for receiving the rotatable shaft 14 therein. Thus, the rotatable shaft 14 is rotatably held by the base plate 10 and the pivotable arm 12. As will be clarified as the description proceeds, the pivotable arm 12 rotates slowly about a rotational axis "R" of the rotatable shaft 14 by the rotation of the rotatable shaft 14. To rotate the rotatable shaft 14, for example, a manual control lever (not shown) can be fixed to an outer end portion of the rotatable shaft 14 or an electric motor (not shown) can be operatively connected to an inner end portion of the rotatable shaft 14.

The base plate 10 and the pivotable arm 12 are respectively formed with first wall portions 10a and 12a and second wall portions 10b and 12b. The first wall portion 10a or 12a and the second wall portion 10b or 12b define a larger circular space 10c or 12c and a smaller circular space 10d or 12d, respectively. The larger and smaller circular spaces 10c, 12c, 10d, and 12d are disposed about the rotational axis "R" of the rotatable shaft 14 and receive the control gear 16, the planetary gears 18, and the supporting plates 20 therein.

The base plate 10 and the pivotable arm 12 are respectively formed at cylindrical surfaces defined by the larger circular spaces 10c and 12c thereof with ring gears 10e and 12e, respectively. The ring gears 10e and 12e are disposed side-by-side with each other and have the same addendum circle but a different number of teeth.

The control gear 16 is mounted on the rotatable shaft 14 so as to be coaxial therewith. If desired, the rotatable shaft 14 may be monolithically formed with the control gear 16.

A toothed portion (no numeral) of the planetary gear 18 and the control gear 16 have the same thickness which is defined in a horizontal direction (see FIG. 3). Each planetary gear 18 is meshed with the control gear 16 in such a manner that the toothed portions of the planetary gears 18 are radially aligned with the control gear 16. Each planetary gear 18 is also meshed with the ring gears 10e and 12e of which total width is substantially the same as the thickness of the toothed portion of the planetary gear 18. Each planetary gear 18 is formed with two opposed cylindrical projections 18a which are disposed about a rotational axis (not shown) of the planetary gear 18. Each projection 18a has a smooth cylindrical surface which is in abutment with a cylindrical surface defined by the smaller circular space 10d or 12d.

Each supporting plate 20 is disklike in shape and has a circular through hole 20a at its center for receiving the rotatable shaft 14 therein. The supporting plate 20 is rotatably mounted on the rotatable shaft 14. The control gear 16 is sandwiched between the supporting plates 20. The supporting plate 20 and the projection 18a of the planetary gear 18 have substantially the same thickness which is defined in a horizontal direction. The supporting plate 20 is in abutment at its cylindrical smooth periphery surface with the projections 18a of the planetary gears 18. Thus, when the planetary gears rotate, the cylindrical projections are rotatably in abutment with the periphery surface of the supporting plate 20.

In operation, when the rotatable shaft 14 is rotated, the control gear 16 is integrally rotated therewith and motion is transmitted through the planetary gears 18 to the ring gears 10c and 12e. Since the ring gears 10e and 12e have a different number of teeth, rotation of the planetary gears 18 causes rotation of the ring gear 12e relative to the ring gear 10e. Therefore, a small angular movement of the pivotable arm 12 is effected. Thus, the seatback pivots slowly in a forward or rearward direction relative to the seat cushion.

When rotation of the rotatable shaft 14 is stopped, the seatback stops at an angular position. Under this stopped condition, the seatback does not move even when the same is applied with an external force. This is because of the great speed reduction ratio possessed by the seat reclining mechanism. Thus, the seatback is kept at a desired position as long as the rotatable shaft 14 is at a standstill.

Figure 4:
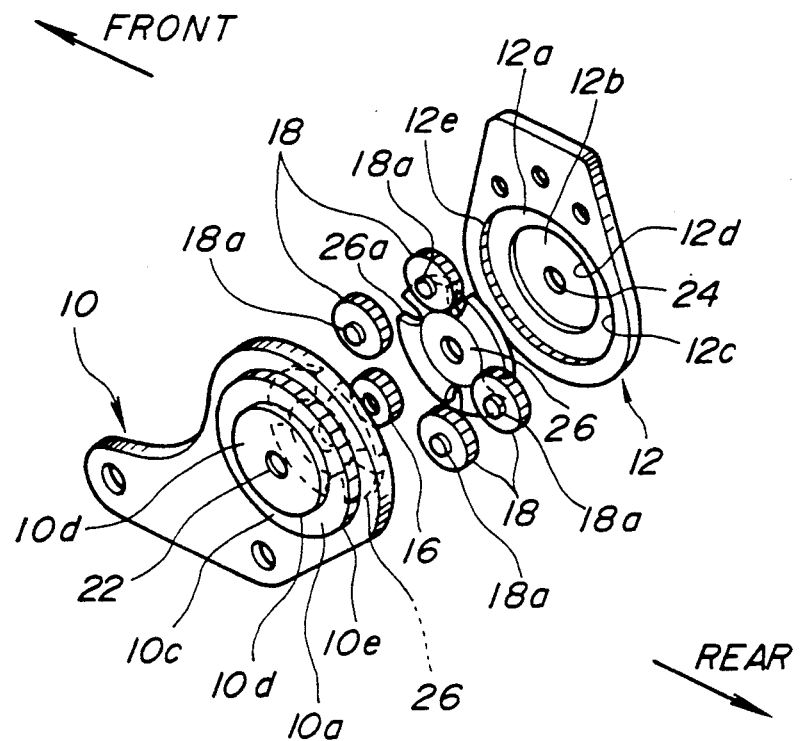
FIG. 4 is a view similar to FIG. 1, but showing a seat reclining mechanism, which is a second embodiment of the present invention.
Figure 5:
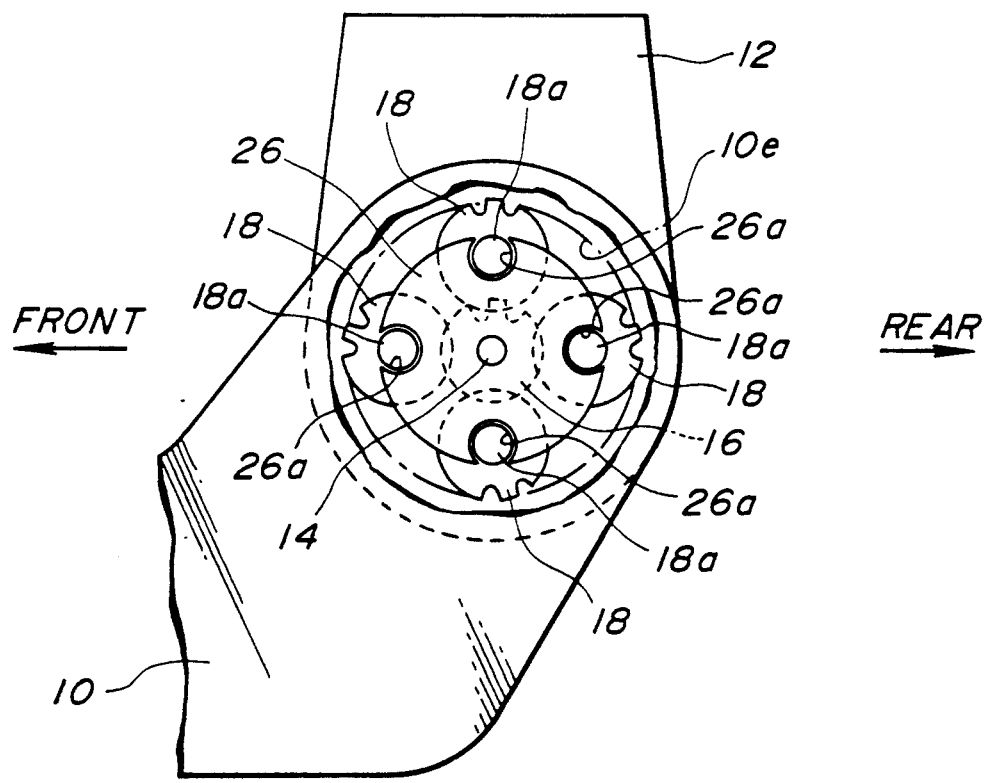
FIG. 5 is a view similar to FIG. 2, but showing a seat reclining mechanism of the second embodiment.

Referring to FIGS. 4 and 5, there is shown a seat reclining mechanism, which is a second embodiment of the present invention.

For ease of description, parts and constructions substantially identical to those of the aforementioned first embodiment will be denoted by the same numerals, and detailed explanation of them will be omitted from the following.

Designated by numeral 26 are supporting plates or supporting members. Each supporting plate 26 of the second embodiment is larger in size than the supporting plate 20 of the first embodiment. The supporting plate 26 has four notches 26a for supporting the projections 18a of the planetary gears 18 in such a manner that each projection 18a is smoothly rotatable therein. The notches 26a are equidistantly spaced about the periphery of the supporting plate 26.

In the above-mentioned first and second embodiments, each planetary gear 18 has two projections 18a, and the base plate 10 and the pivotable arm 12 are respectively formed with the smaller circular spaces 10d and 12d to receive the projections 18a of each planetary gear 18 and the supporting plates 20 or 26. However, if desired, each planetary gear 18 may be formed with only one projection 18a, and only one of the base plate 10 and the pivotable arm 12 may be formed with the smaller circular space 10d or 12d to receive the projection 18a of each planetary gear 18 and the supporting plate 20 or 26.

The advantages of the seat reclining mechanism of the present invention will be described in the following.

Since each planetary gear 18 smoothly rotatably supported at its two projections 18a by the supporting plates 20 or 26, abrasion of teeth of the planetary gears 18 are substantially reduced as compared with the aforementioned conventional seat reclining mechanism. Therefore, durability of the seat reclining mechanism is substantially improved.

Since the planetary gears 18 are smoothly rotatably supported by the supporting plates 20 or 26, torque to be applied to the rotatable shaft 14 can be reduced as compared with the conventional reclining mechanism.

Since the control gear 16 and the toothed portion of each planetary gear 18 have the same thickness, durability of the seat reclining mechanism is improved as compared with the conventional seat reclining mechanism.

Since each planetary gear 18 is received at its projections 18a in the notches 26a of the supporting plate 26 in the second embodiment, the planetary gears 18 are precisely held in position.

What is claimed is:

1. A seat reclining mechanism comprising:
    a rotatable shaft;
    a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;
    a pivotable arm which is rotatably connected to said base plate through said rotatable shaft, said pivotable arm having a second through hole for receiving said rotatable shaft therein, said second through hole being in alignment with said first through hole, said pivotable arm having at a major surface thereof a second cylindrical recess which is merged with said first cylindrical recess so as to define a cylindrical space between said base plate and said pivotable arm, said second cylindrical recess being coaxial with said rotatable shaft, said pivotable arm having at a cylindrical surface defined by said second cylindrical recess a second ring gear which is disposed side by side with said first ring gear, said first and second ring gears having the same addendum circle but a different number of teeth;

a third cylindrical recess which is formed on one of said base plate and said pivotable arm, said third cylindrical recess being disposed within one of said first and second cylindrical recesses and being coaxial with said rotatable shaft;

a control gear securely and coaxially mounted on said rotatable shaft, said control gear being received in said cylindrical space;

a plurality of planetary gears each of which has a toothed portion received in said cylindrical space and a first cylindrical projection formed on a rotation center thereof, said toothed portion being positioned between and meshed with said first and second ring gears and said control gear, said first cylindrical projection being received in said third cylindrical recess; and a first supporting member for supporting said first cylindrical projections of said planetary gears, said first supporting member being coaxially and rotatably mounted on said rotatable shaft and being received in said third cylindrical recess, each of said first cylindrical projections being rotatably held by and between said first supporting member and a cylindrical smooth outer surface of said third cylindrical recess so as to suppress play of said first cylindrical projection therebetween.

2. A seat reclining mechanism as claimed in claim 1, in which said toothed portions of said planetary gears are radially aligned with said control gear, and in which said control gear and said toothed portions have the same thickness which is defined in a horizontal direction so as to achieve a fully meshed condition therebetween.

3. A seat reclining mechanism as claimed in claim 1, in which said first supporting member is positioned adjacent to said control gear, said first cylindrical projections are radially aligned with said first supporting member, and said first supporting member and said first cylindrical projections have the same thickness which is defined in a horizontal direction.

4. A seat reclining mechanism as claimed in claim 1, in which said first supporting member is disklike in shape and has at a periphery thereof a cylindrical surface with which said first cylindrical projections are rotatably in abutment.

5. A seat reclining mechanism as claimed in claim 1, in which said first supporting member is generally disklike in shape and has at a peripheral portion thereof a plurality of notches in each of which said first cylindrical projection is rotatably fit.

6. A seat reclining mechanism as claimed in claim 5, in which said notches are equidistantly spaced about the peripheral portion of said first supporting plate.

7. A seat reclining mechanism as claimed in claim 1, further comprising a second supporting member which is in alignment with said first supporting member, said control gear being interposed between said first and second supporting members.

8. A seat reclining mechanism as claimed in claim 7, in which each of said planetary gears has a second cylindrical projection which is opposed to and aligned with said first cylindrical projection, and in which each of said base plate and said pivotable arm has said third cylindrical recess for receiving one of said first and second cylindrical projections and one of said first and second supporting members.

9. A seat reclining mechanism as claimed in claim 8, in which said base plate and said pivotable arm have first and second stepped wall portions for defining said first and second cylindrical recesses and third cylindrical recesses, respectively.

10. A seat reclining mechanism as claimed in claim 1, in which said first supporting member is sized so that said first cylindrical projection is held between said first supporting member and said cylindrical smooth outer surface of said third cylindrical recess.

11. A seat reclining mechanism as claimed in claim 1, in which said first cylindrical projection rolls on said cylindrical smooth outer surface of said third cylindrical recess.

* * * * *